United States Patent Office

2,908,687
Patented Oct. 13, 1959

2,908,687

α-ISONICOTINOYL-β-CARBALKOXYHYDRAZINES

Syoiti Ban, Osaka, Japan, assignor to Takeda Pharmaceutical Industries, Ltd., Osaka, Japan No Drawing. Application November 18, 1957
Serial No. 696,914

Claims priority, application Japan September 14, 1957

9 Claims. (Cl. 260—295)

The present invention relates to therapeutically useful derivatives of isonicotinoyl-hydrazine (hereinafter referred to as INAH), and more especially to the α-isonicotinoyl-β-carbalkoxyhydrazines which are represented by the formula

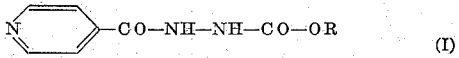

$$\text{N} \diagup\!\!\!\diagdown -\text{CO}-\text{NH}-\text{NH}-\text{CO}-\text{OR} \quad (I)$$

and to the acid addition salts (of which the hydrochlorides are typical), R being an alkyl or cycloalkyl group with 4 to 18 carbon atoms.

As is widely known, INAH is an excellent anti-tuberculotic. It is, however, bound up with certain deficiencies (as will hereinafter appear) which have spurred the art into considerable activity toward the embodiment of improved derivatives, free from such deficiencies.

The present invention provides a series of effective antituberculotic compounds (I) which have the desired superior properties and which are free from the undesired deficiencies. Thus, the new compounds (I) of the present invention, wherein the radical R contains four to eighteen carbon atoms, have the following characteristics in comparison with INAH:

(1) They are superior to INAH in respect of antibacterial activity against tubercle bacilli. Thus, e.g. α-isonicotinoyl-β-carbo-2-ethylhexyloxyhydrazine hydrochloride, α-isonicotinoyl-β-carbo-n-decyloxyhydrazine hydrochloride and α-isonicotinoyl-β-carbo-n-dodecyloxyhydrazine hydrochloride completely inhibit the growth in vitro of INAH-sensitive human type tubercle bacilli (H37Rv strain) at concentrations as low as $1 \times 10^{-11}$ and $1 \times 10^{-12}$ moles per liter, whereas at these concentrations INAH permits growth and, in fact, at the last mentioned concentration, a good growth of the said bacilli.

(2) The new compounds (I) show considerable activity against INAH-resistant tubercle bacilli. Thus, e.g. α-isonicotinoyl-β-carbo-2-ethylhexyloxyhydrazine hydrochloride and α-isonicotinoyl-β-carbo-n-decyloxyhydrazine hydrochloride completely inhibit the growth in vitro of INAH-resistant human type tubercle bacilli (H37Rv strain; 30γ resistant) at a concentration as low as $1 \times 10^{-7}$ moles per liter, whereas at this concentration INAH permits a good growth of the said bacilli.

(3) When INAH is administered in vivo, it is for the most part rapidly changed into its acetyl derivative, the activity of which is one-thousandth of that of INAH, whereas the compounds (I) of the present invention hardly undergo such acetylation at all or else the velocity of the acetylation is so extremely slow that the action of the new compounds (I) remains unprejudiced and is long lasting.

(4) The acute toxicities of the compounds (I) are less than that of INAH on a molecular weight footing; i.e. their $LD_{50}$ is lower than that of INAH. In the mouse, for example, the $LD_{50}$ (mg./kg.) for INAH, when the latter is injected intraperitoneally, is 200. In the corresponding circumstances, the $LD_{50}$ for e.g. α-isonicotinoyl-β-carbo-n-decyloxyhydrazine hydrochloride is 900, and for α-isonicotinoyl-β-carbo-n-dodecyloxyhydrazine hydrochloride it is 700.

(5) INAH has the extremely undesirable defect that it is subject to combine with vitamin $B_6$ in vivo, whereby a living body administered with INAH is apt to suffer from vitamin $B_6$-avitaminosis, whereas the compounds (I) of the present invention have no tendency to such inactivation of vitamin $B_6$.

The R substituents (cf. Formula I supra) may be normal, iso or cyclic. Illustrative thereof are n-butyl, iso-butyl, heptyl, hexyl, octyl, nonyl, decyl, undecyl, dodecyl, myristyl, palmityl, stearyl, cyclohexyl, etc.

The compounds (I) of the present invention can be conveniently synthesized by introducing a carbalkyloxy radical of which the alkyl has four to eighteen carbon atoms into the β-nitrogen of INAH. More concretely, the above reaction is effected by the following processes, for example.

One process comprises adding a halogenocarbonic acid ester to a solution or suspension of INAH at room temperature (about 20° to about 30° C.) with stirring. As solvent, there may be used hydrous or anhydrous alcohols, etc. And as the halogenocarbonic acid ester, butyl chlorocarbonate or pentyl chlorocarbonate or others may be used depending on the desired product. When INAH is used as a suspension, it generally dissolves before the separation of the product, but in certain cases dissolution of INAH and separation of the product occur at the same time. When INAH is employed as a solution, crystals of the product separate out gradually from the reaction mixture. In these cases the product is obtained in the form of e.g. monohydrochloride, and the free base is obtained by neutralizing an aqueous solution of the product with a weakly alkaline agent such as sodium bicarbonate.

Another process comprises dissolving INAH in an alcohol which corresponds to the desired product and reacting the solution with a carbonylhalide such as phosgene. In this case the alcohol may be employed together with another suitable solvent. The product in this process is also e.g. monohydrochloride. The reaction mechanism of this process is as follows: the halocarbonate corresponding to the alcohol used is first produced and then it reacts with INAH. Therefore, the reaction is essentially the same as that mentioned before.

The product thus obtained is purified by a method such as recrystallization from a suitable solvent, and methanol or ethanol may generally be used as the solvent.

It is clear from the foregoing that the compounds of the present invention are highly active against tuberculosis, in vivo as well as in vitro. The new compounds may be administered orally, e.g. in the form of powders, tablets, capsules or the like.

The following examples set forth presently-preferred representative embodiments of the invention. In these examples, the parts are by weight, and the temperatures are uncorrected.

Example 1

To a suspension of 5 parts of INAH in 35 parts of methanol is added dropwise a solution of 5 parts of n-butyl chlorocarbonate in 10 parts of methanol with cooling and stirring, whereupon the mixture becomes a yellowish green clear solution. The solution is allowed to stand overnight, then concentrated and cooled, separating crystals of α-isonicotinoyl-β-carbo-n-butyloxyhydrazine monohydrochloride. The product crystallizes from methanol in the form of colorless crystals, M.P. 178–180° C. (decomp.).

The product is fairly soluble in methanol, and its picrate melts at 165–167° C. (decomp.).

Example 2

Five parts of INAH, and 5.5 parts of iso-butyl chlorocarbonate are treated as in Example 1, obtaining 8 parts of α-isonicotinoyl-β-carbo-iso-butyloxyhydrazine monohydrochloride.

The product is recrystallized from methanol in the form of colorless plates, M.P. 206–208° C. Its picrate melts at 169–170° C.

Example 3

To a suspension of 5 parts of INAH in 50 parts of methanol is added dropwise a solution of 5.5 parts of n-pentyl chlorocarbonate in 10 parts of methanol at room temperature with stirring, whereupon the INAH dissolves and the product separates out gradually. After standing for one hour at room temperature, the reaction mixture is concentrated under reduced pressure and cooled, and the resulting crystals are purified by recrystallization from methanol to give α-isonicotinoyl-β-carbo-n-pentyloxyhydrazine monohydrochloride, M.P. 257–260° C. (decomp.). Its picrate melts at 186° C.

Example 4

Use of iso-pentyl chlorocarbonate instead of n-pentyl chlorocarbonate and treatment as in Example 3 give α-isonicotinoyl-β-carbo-iso-pentyloxyhydrazine monohydrochloride, M.P. 204–205° C. (decomp.). Its picrate melts at 168–170° C.

Example 5

To a suspension of 5 parts of INAH in 50 parts of methanol is added dropwise a solution of 7 parts of 2-ethylhexyl chlorocarbonate in 20 parts of methanol with stirring and cooling with ice, whereupon the INAH dissolves gradually, but the product separates out simultaneously. After stirring for one hour to complete the reaction, the reaction mixture is cooled with ice and the resulting product is purified by recrystallization from methanol to give α-isonicotinoyl-β-carbo-2-ethylhexyloxyhydrazine monohydrochloride, M.P. 199–201° C. (decomp.). Its picrate melts at 168–169° C.

Example 6

Five parts of INAH and 7.8 parts of crude n-octyl chlorocarbonate (purity 90%) are reacted as in Example 1, whereupon the mixture becomes a yellow clear solution but the product soon begins to separate out, the solution becoming finally mushy. A considerable amount of methanol is added to the reaction mixture, the separated crystals are filtered, and the filtrate is concentrated to separate the remaining crystals. The combined crystals are purified by recrystallization from methanol to give 10.2 parts of α-isonicotinoyl-β-carbo-n-octyloxyhydrazine monohydrochloride as colorless long needles, M.P. 201–203° C. (decomp.). The product dissolves in water with turbidity and the solution foams when shaken. Its picrate melts at 147–148° C. (decomp.).

Neutralization of an aqueous solution of the monohydrochloride with a saturated aqueous solution of sodium bicarbonate gives free α-isonicotinoyl-β-carbo-n-octyloxyhydrazine as colorless crystals, M.P. 43–45° C.

Example 7

In Example 3, if other alkyl chlorocarbonates are used instead of n-pentyl chlorocarbonate, the following results are obtained:

| Alkyl chlorocarbonate | | α-isonicotinoyl-β-carbalkyloxyhydrazine | | |
|---|---|---|---|---|
| | | Hydrochloride | | Picrate |
| Alkyl | Parts by weight | Purity (percent) | M.P.(° C.) (decomp.) | Yield (Parts) | M.P.(° C.) (decomp.) |
| n-decyl | 9 | 90 | 196–198 | 11 | 136–138 |
| n-dodecyl | 10.5 | 90 | 195–197 | 11 | 134–136 |
| cyclohexyl | 12 | 50 | 214–215 | 8.3 | 173–175 |

Aqueous solutions of the above products all foam when they are shaken.

Example 8

To a hot solution of 6.8 parts of INAH in 400 parts of dioxane are added 6.5 parts of n-octylalcohol and the mixture is cooled to 10° C. with stirring, a suspension of fine crystals of INAH being obtained. To the suspension is added gradually a solution of 5 parts of phosgene in 50 parts of dioxane over a period of 30 minutes with cooling with ice-water and vigorous stirring. After the addition of the phosgene solution, the mixture is agitated for one hour at 10° C., then for a second hour at 30° C. and finally for a third hour at 55–60° C. to complete the reaction. The dioxane is removed by distillation under reduced pressure, the residue is dissolved in 200 parts of water and the solution is made alkaline with 50% aqueous potassium carbonate solution. The alkaline solution is extracted with ether and the extract, after being dried over anhydrous magnesium sulfate, is evaporated to dryness, obtaining 6 parts of the crude product. The product is dissolved in the smallest amount of 2% aqueous hydrochloric acid, the solution, after treating with charcoal, is evaporated to dryness and the residue is recrystallized from methanol, whereupon α-isonicotinoyl-β-carbo-n-octyloxyhydrazine is obtained as colorless long needles, M.P. 201–203° C. The product shows no depression in M.P. when admixed with the product of Example 6. The picrate of the product melts at 147–148° C., which is in complete agreement with the melting point of the picrate of the product obtained in Example 6.

Example 9

To a suspension of 5 parts of INAH in 130 parts of methanol, 11.1 parts of n-tetradecyl chlorocarbonate are added dropwise at room temperature with agitation, whereupon the mixture becomes a clear solution and then crystals separate out gradually. After the addition of the chlorocarbonate, the reaction mixture is left standing at room temperature for two hours and cooled with ice. The separated crystals are recrystallized from 80 parts of methanol, obtaining 12.8 parts (85%) of α-isonictinoyl-β-carbo-n-tetradecyloxyhydrazine monohydrochloride as colorless glossy scales, M.P. 191–193° C. (decomp.). Its picrate melts at 134–136° C.

Example 10

When 12.2 parts of n-hexadecyl chlorocarbonate is used instead of n-tetradecyl chlorocarbonate in Example 9 and the product is recrystallized from 140 parts of methanol, 13.7 parts (85%) of α-isonicotinoyl-β-carbo-n-hexadecyloxyhydrazine monohydrochloride, M.P. 197–199° C. (decomp.), are obtained. Its picrate melts at 132–134° C.

Example 11

When 13.3 parts of n-octadecyl chlorocarbonate is used instead of n-tetradecyl chlorocarbonate in Example 9 and the product is recrystallized from 250 parts of methanol, 14.5 parts of α-isonicotinoyl-β-carbo-n-octadecyloxyhydrazine monohydrochloride, M.P. 196–198° C. (decomp.), are obtained. Its picrate melts at 131–133° C.

Having thus disclosed the present invention, what is claimed is:

1. A member selected from the group consisting of compounds having the formula

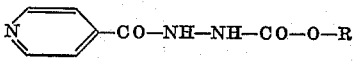

and the hydrochlorides thereof, wherein R is a normal alkyl radical having four to eighteen carbon atoms.

2. A compound having the formula

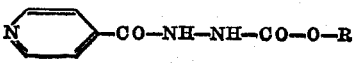

wherein R is an iso-alkyl radical having four to eighteen carbon atoms.

3. α-Isonicotinoyl-β-carbo-n-pentyloxyhydrazine.
4. α-Isonicotinoyl-β-carbo-2-ethylhexyloxyhydrazine.
5. α-isonicotinoyl-β-carbo-n-octyloxyhydrazine.
6. α-Isonicotinoyl-β-carbo-n-decyloxyhydrazine.
7. α-Isonicotinoyl-β-carbo-n-dodecyloxyhydrazine.
8. α-Isonicotinoyl-β-carbo-n-butoxyhydrazine.
9. α-Isonicotinoyl-β-carbo-n-octadecyloxyhydrazine.

References Cited in the file of this patent

UNITED STATES PATENTS 2,745,839    Ehrhart et al.   _____ May 15, 1956

OTHER REFERENCES

Yale et al.: J. Am. Chem. Soc., vol. 75, pp. 1933–1942 (1953).